July 30, 1940.  J. H. GOSS ET AL  2,209,815
PHOTOMETER
Filed Dec. 17, 1938
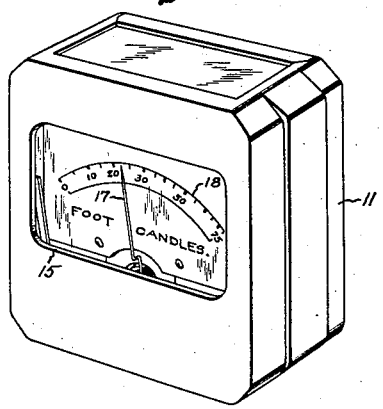
Inventors:
James H. Goss,
Francis K. McCune,
by Harry E. Dunham
Their Attorney.

Patented July 30, 1940

2,209,815

UNITED STATES PATENT OFFICE 2,209,815

PHOTOMETER

James H. Goss and Francis K. McCune, Swampscott, Mass., assignors to General Electric Company, a corporation of New York Application December 17, 1938, Serial No. 246,390

10 Claims. (Cl. 88—23)

This application is a continuation-in-part of our co-pending application, Serial No. 48,504, filed November 6, 1935 and assigned to the same assignee as the present application.

Our invention relates to photometers or devices for measuring light, and more particularly to devices which employ a light-sensitive unit of the solid type.

An object of the present invention is to provide a photometer having a construction which combines the light-sensitive member and the current measuring device into a compact, portable and inexpensive unit. Another object is to provide an improved photometer which is simple in design and construction and hence, one which lends itself to quantity production. Other objects are to provide a photometer which offers the maximum utility, not only from the standpoint of measuring light coming from many directions but also from the standpoint of greater accuracy in aligning the light-sensitive surface with respect to a particular direction of light; to provide a photometer which has the maximum amount of light-sensitive surface for a given size of electrical measuring instrument to which the cell is connected and consistent with the practical and usable location of the cell; to provide a construction in which the cell is supported by resilient means, in which the parts of the photometer may be easily and quickly assembled, in which it is unnecessary to make any electrical connections after assembly, and in which the cell may be tested and the current measuring device may be tested and adjusted before assembly of the photometer. In carrying out these objects, the electrical measuring and light-sensitive devices are contained in a single casing of moldable material, the casing being provided with a compartment which extends along one of the sides of the casing and is adapted to contain a light-sensitive unit of substantially the same length as the casing. Other objects and features will be apparent as the following specification is perused in connection with the accompanying drawing and those features which are believed to be novel and patentable will be pointed out in the claims appended hereto. In the drawing Figure 1 represents a view in perspective of a photometer improved in accordance with our invention. Figure 2 is a rear elevation of the improved photometer with portions broken away in order to show the inner construction. Figure 3 is a fragmentary view in perspective of the embodiment of Figures 1 and 2 with the interior of the casing exposed and with sections cut through various walls of the casing, and Figure 4 is an elevation largely in section showing the apparatus as seen from the right looking in the direction of the arrows 4—4 in Figure 2. Like reference characters are utilized throughout the drawing to designate like parts.

In the embodiment of our invention illustrated in the drawing there is a casing 11 of a rectangular configuration and preferably made of a phenolic condensation product, such as Bakelite for example. As shown in Figures 2, 3 and 4, the casing is hollow and is provided at one end, the upper end as shown in these figures with a rectangular compartment indicated at 12. The compartment is partitioned off from the remainder or main portion of the casing by a wall or a shelf 13. An inwardly extending lip or flange 14 is provided for a purpose which will be explained presently. The front part of the casing, as shown in Figures 1 and 4 is provided with an opening 15 of any suitable shape, for example, rectangular as illustrated, and the back of the casing is entirely open at the time the casing is molded. Thus there are three openings in the casing at three different faces, the front opening, the top rectangular opening, and the entire back of the casing. A casing of this sort may be readily molded on machines of standard design, in fact, those machines which are employed to mold the casings of voltmeters and ammeters may be readily modified to mold the casing which has been described.

Within the main part of the casing 11, there is a microammeter, indicated broadly by the reference numeral 16, of any suitable and well-known design, and mounted in a manner which will be explained hereinafter. The instrument 16 is provided in the customary manner with a movable pointer 17 and a cooperating scale face 18, the latter being marked in foot candles or similar indicia. No further description of the instrument 16 appears to be necessary other than to state that it is provided with a zero correction mechanism 19 of any suitable type and the zero correction mechanism 19 is at the end of the instrument shaft toward the back of the instrument instead of toward the front, in order that zero adjustment may be made and checked before assembly of the photometer, as will be explained hereinafter, and in order to permit using a casing having less depth from front to back. In response to a voltage impressed across the terminals of the instrument 16, the indicating needle or pointer 17 traverses the scale face 18 and comes to rest at a position which indicates a certain number of foot candles in terms of the current flowing through the instrument.

For operating the instrument 16 a light-sensitive device of any suitable current-generating type is employed and preferably the type which has been described and claimed in the co-pending application of Clarence W. Hewlett, Serial No. 716,677, filed March 21, 1934 and entitled "Photoelectric cell and manufacturing processes therefor." Such a cell has been illustrated in Figures 2, 3, and 4 and is contained within the compartment 12 of the casing. As stated in the Hewlett application referred to, the cell consists essentially of a plate 20 of rectangular configuration and fabricated of a base metal such as iron or nickel. The plate is first ground off to make it smooth and clean, and then sand-blasted, in order to give the light-sensitive material 21 (see Figures 3 and 4) a good grip on the surface. This work is of course done before the plate is assembled in the casing. The plate may then be mounted in any standard form of vacuum chamber and selenium evaporated in a high vacuum and condensed on the sand-blasted iron surface to form the light sensitive layer 21. The plate is then heated slightly above the melting point of selenium and the condensed layer melted. The plate may then be quickly cooled in an oven at a temperature of approximately 185° C. and held at this temperature for a period of 24 to 72 hours, the exact time of which can be determined by experiment and depends to some extent upon the initial quality of the selenium employed.

The selenium-covered iron plate is thereafter placed in an evacuated chamber, preferably containing argon at a pressure of about 200 microns and a thin film 22 of a metal belonging to the second group of elements appearing in the Mendelejeff Periodic Table, such as cadmium, is sputtered on to the selenium, employing a sputtering current of about 50 milliamperes. The sputtering effect is preferably carried out in short flashes so as to avoid heating the selenium surface unduly. During the sputtering process, a flask of liquid air is arranged to cool the sputtering chamber so that any condensable vapors may be immediately removed from the discharge.

After the layer of cadmium or similar metal has been deposited on the selenium, the plate is removed from the chamber and laid aside in the air to age until the current sensitivity of the coated plate comes down to practically zero, at which time the electromotive force generated by the impingement of ambient light on the cell increases rapidly. The aging step is terminated when the electromotive force reaches a maximum.

The cadmium-selenium-coated plate is again placed in the chamber containing argon and a very thin film 23 of platinum or other non-oxidizable metal sputtered on top of the cadmium, the thickness of the platinum being exceedingly thin and just barely visible on the surface.

For the purpose of closing the opening at the back of the casing 11 and for removably supporting the instrument 16, a back plate 24 is provided which may be composed of the same material as the remainder of the casing 11. The back plate 24 is so dimensioned as to fit within the bottom wall of the casing 11, as shown at 25, but to extend upward as high as any portion of the casing. A flange or lip 26 is formed in the back plate 24 corresponding to the lip 14 which runs along the remaining three sides of the top opening in the casing 11. The top and back openings of the casing 11 are thus contiguous before the back plate 24 is in place. In order that the back plate 24 may be secured by means of screws without applying excessive pressure to the material of which the back plate is composed, and for other purposes which will appear hereinafter, an additional back plate 27 composed of metal is provided which fits outside the molded back plate 24. The back plate 24 serves as a base for the instrument 16 which is secured thereto in a conventional manner before the photometer as a whole is assembled.

Before the back plate 24 carrying the instrument 16 has been secured to the casing 11, the coated light-sensitive plate 20 is mounted in the compartment 12. In view of the fact that the casing is open at the back during assembly the coated plate may be slipped into place readily into the compartment 12 with the ends of the plate resting in the grooves formed between the shelves 13 and flanges 14. It will be observed that the upper and lower surfaces of said grooves are formed by the lower surface of the flanges 14 and the upper surface of the shelves 13, respectively, which surfaces are parallel to the top and bottom walls of the casing 11. As shown in Figures 2, 3 and 4 a conducting member 28 is positioned above the top surface of the coated plate 20. The conducting member 28 may be of any suitable shape, such as to make electrical contact with the top surface of the light-sensitive coated plate 20, i. e., the top of the platinum layer 23. For example, the member 28 may be a rectangular frame of the same outside size as the plate 20 in the form of a perimetrically complete punching which extends all along the edge of the top surface of the coated plate. For use as an electrical terminal of the light-sensitive device a backwardly projecting tab 29 is formed in the conducting frame 28. For protecting the light-sensitive plate 20 a fairly heavy glass plate 30 is provided which rests upon the conducting frame 28. In order to force the coated plate and the glass member against the flange 14 so as to hold the respective parts of the light-sensitive device firmly in place, there may be provided a spring strip 31 which bears at each end against the ledge or shelf 13 and at the middle against the bottom surface of the plate 20. It will be understood that the spring strip 31 is bowed with the ends curved downward. For the purpose of providing a second electrical terminal for the light-sensitive plate or cell 20 a backwardly projecting tab 32 is formed also in the spring strip 31 which is composed of conducting material, such as metal. The tabs or terminals 29 and 32 however are offset or occupy different positions along the back of the photometer for reasons which will be explained.

In placing the light-sensitive member in position, it has been found that the most practical way is to assemble the coated plate, the conducting frame, the glass plate and the spring together and while holding the spring in a flattened position, to sandwich the assembly into the compartment 12, after which the force on the spring may be relased, and the glass plate 30 will bear snugly against the inner surface of the flange 14.

The instrument 16 is provided with terminal strips 34 and 35 laid in suitable channels 36 and 37 formed in the inside surface of the back plate 24. The channels 36 and 37 are not of uniform depth but are stepped to have increased depth at the upper ends 38 and 39, as shown in Figure 3, the deepened channel portion 39 being shorter than the deepened portion 38. The upper ends of the terminal strips 34 and 35 are correspondingly bent and the lengths of the offset portions 40 and 41 are made the same so that when the terminal strips are resting in the channels 36 and 37 at the lowermost position possible, by reason of the lower limits of the deepened upper portions 38 and 39, the tip 41 of the terminal strip 35 will project upward further than the tip 40 of the terminal strip 34, the difference in distance of upward projection being such as to correspond to the difference in height of the terminal tabs 29 and 32 of the light-sensitive device 20. The lateral positions of the terminal strips 34 and 35 are such that when the back plate 24 is secured to the casing 11 the terminal strip 35 will make contact with the terminal tab 29, and the terminal strip 36 will make contact with the terminal tab 32. The vertical positioning of the tabs 29 and 32 and of the upper ends of the tips 40 and 41 of the terminal strips 34 and 35 are such that the tip 41 extends upward far enough to make contact with the tab 29, and the tip 40 extends upward far enough to make contact with the tab 32, but does not project therebeyond a distance as great as the thickness of the iron plate 20. Furthermore, the terminal strips 34 and 35 are composed of spring material and are slightly bowed, particularly at the end portions 40 and 41 with the tips biased toward the tabs 32 and 29, so that the tip 41 can contact the light sensitive plate 20 only at the top surface to which the tab 29 is connected, and the tip 40 can contact the plate 20 only at the lower surface to which the tab 32 is electrically connected. In this way short circuiting of the light-sensitive device by the terminal strips 34 and 35 is prevented even in cases where owing to inadvertence in manufacture the terminal tabs 29 and 32 should be absent or be of less than specified length.

After the various parts of the photometer have been assembled the metal back plate 27 is placed against the molded back plate 24 and secured to the casing 11 by means of suitable screws, such as the screws 42, for example, cooperating with suitable molded-in nuts, not shown, located at the bottom of screw holes such as the screw holes 43.

The terminal strips 34 and 35 are held in place in the channels 36 and 37 by the instrument magnet 16a which is fastened to the back plate 24. Preferably a sheet of insulating material 16b is interposed between the magnet 16a and the back plate 27 and strip 35. The strip 34, however, may be grounded to the magnet 16a at 16c (Figs. 3 and 4). The instrument movable coil (not shown) may also be grounded at one end to the magnet 16a by a connection through the instrument shaft and one of the spiral biasing springs 19a. The other end of the instrument coil, however, is connected through an insulated spiral 19b, in a manner well understood to those skilled in the art to a conductor 16d, soldered to the lower end of the terminal strip 35.

In operation, the improved photometer may be placed in a position with respect to the light source to be measured so that the light impinges on the light-sensitive unit through the plate glass 30, and the position that the needle takes up along the scale will tell at a glance the intensity of light reaching the cell and whether or not the light is of sufficient intensity for the purpose at hand.

It will be understood that with the instrument 16 connected to the light-sensitive device 20, the device 20 cannot be checked separately and the zero adjustment of the instrument 16 considered independently cannot be verified so long as there is a possibility of light falling upon the cell 20 or of current being generated thereby. Accordingly the apparatus is so constructed that the light-sensitive device 20 may be tested in the casing without the instrument 16 and the electrical calibration of the instrument may be checked before assembly in the casing 11 without any necessity for disturbing electrical connections or the cell 20 after the photometer has been assembled.

The zero adjusting mechanism 19 is placed at the back portion of the instrument and an opening 44 is provided in the base or back plate 24 to expose the customary forked arm 45 of the zero adjusting mechanism 19. For the purpose of adjusting the forked zero adjusting arm 45 a slider 46 is provided and a vertical groove 47 is formed in the outer surface of the back plate 24 for receiving the slider 46. The slider 46 has an inwardly extending projection 48 for engaging the forked arm 45 and an outwardly extending projection 49 which may be engaged by a thumb nail of the operator utilizing the photometer. The metal reinforcing the back plate 27 is provided with a vertically elongated slot 50 for exposing the projection 49 of the zero adjusting slider 46 and the plate 27 serves to hold the slider 46 in its groove 47. The plate 27 may be embossed or engraved to carry suitable tables, such as the recommended illumination levels for various types of work and other data, such as the trade mark of the manufacturer and the name of the apparatus and serves a multifold purpose as a name and information plate, means for securing the zero adjusting slider 46 and means for reinforcing the molded back plate 24.

It is evident that our improved photometer constitutes a compact and rugged structure in which the light-sensitive unit and the microammeter are adequately protected by the casing 11 and the glass member 30, thus lending the device to rough usage, if necessary. It is also evident that if desired, the glass member may include, either as a separate element or by physical incorporation in the glass itself, a filter for determining the quality of light which is permitted to reach the light-sensitive surface. The dimensions of the photometer are relatively small. As giving some indication as to the compactness of the improved photometer, a device has been made in which the dimensions of the casing as measured across the scale face are 2¼ inches by 2¼ inches and the depth is approximately 1⅛ inches. Such a device may be readily carried around in the pocket and has been found to register, in a practical manner, all light intensities, including daylight and artificial light.

It will be noted that in the improved photometer, the light-sensitive element extends substantially over the entire width and depth of the device, so that the entire cross-sectional area of the casing, the dimensions of which are determined by the smallest size of a practical form of microammeter is utilized for the purpose of providing as great a light-sensitive area as is possible. By employing as large a light-sensitive area for a given size of casing as is sufficient to accommodate a microammeter of practical design, the electromotive force generated by the light-sensitive member is as large as possible under these conditions so that the microammeter responds in a very positive manner to any changes of electromotive force produced by changes of light impinging on the light-sensitive device. Moreover, in addition to offering the best design from the standpoints of simplicity of design, ease of fabrication and also from the standpoint of permitting the greatest amount of light-sensitive area for a given size of microammeter, the rectangular design of casing lends itself to greater accuracy in determining the direction and position from which the impinging light is propagated. It is apparent that the straight edges of the casing and the parallel arrangement of the light-sensitive member with respect to the casing facilitate an accurate alignment of the photometer with respect to any given direction of light, so that the direction in which the photometer is pointed is readily and accurately determined when the photometer is held in the hand or is set down on a desk or against a wall.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What we claim as new and desire to secure by Letters Patent of the United States is:

1. A photometer comprising a generally rectangular casing having openings at three faces thereof conveniently designated as the front, top and back face of the casing, the opening at the top face being substantially coextensive with said face, an indicating instrument having its dial visible through the opening in said front face, supporting means extending along the side walls of the casing from front to back in a plane substantially parallel to said top face, a light sensitive device substantially coextensive with said top face and supported by engagement with said supporting means so as to be externally exposed through the opening at such top face, said back opening extending to the top of the casing beyond said supporting means for permitting insertion and removal of said device, a cover plate closing said last-named opening, and electrical connections between said light-sensitive device and said instrument.

2. A photometer comprising a generally rectangular casing having openings in two walls thereof conveniently designated as the front and top walls of the casing, the opening in the top wall being substantially coextensive with said wall, an indicating instrument having its dial face visible through the opening in its front wall, supporting means extending along the side walls of the casing from front to back in a plane substantially parallel to said top wall, a light sensitive device extending along said top wall so as to be externally exposed through the opening in such wall, resilient means interposed between said light-sensitive device and said supporting means resiliently securing said light-sensitive device against said top wall and electrical connections between said light-sensitive device and said instrument.

3. A photometer comprising a generally rectangular casing having openings at three faces thereof conveniently designated as the front, top and back faces of the casing, an indicating instrument having its dial visible through the front opening, a removable plate serving as a back cover for said casing and as a supporting base for said instrument, a light-sensitive device in plate form with offset terminal tabs in electrical contact with the top and bottom surfaces of said light-sensitive device, means for supporting said light-sensitive device along said top face so that the device is externally exposed through the top opening, the terminal tabs being toward the back of said device, said instrument having a pair of terminal strips extending upward along the back cover and toward the top, one of said strips extending upward a greater distance, the difference being approximately that of the thickness of said light-sensitive plate, said further extending strip reaching the position of the terminal tab at the top surface of said light-sensitive device, the other strip reaching the position of the other terminal tab of said device, said instrument being adapted to be placed in position by insertion through the back opening and closure of said back opening by said back cover, whereby the light-sensitive device may be tested separately before insertion of the instrument and the instrument may be tested and adjusted separately before being mounted within said casing, and electrical connections between said light-sensitive device and said instrument will be made automatically by closure of said back wall.

4. A photometer comprising a generally rectangular casing having openings at at least two faces thereof, conveniently designated as the top and back of the casing, a cover for the back opening, an indicating instrument mounted upon said cover, adapted to be inserted through the back opening when the back cover is put in place and having a zero adjuster at the back portion thereof, supporting means extending along the side walls of the casing from front to back in a plane substantially parallel to said top face, a light-sensitive device having a pair of terminal tabs projecting from one side thereof, means for supporting said light-sensitive device in abutment with the top face of said casing so that the light-sensitive device is externally exposed through the top opening, and the terminal tabs extend toward the back of the casing, said instrument having a pair of terminal strips extending to the positions reached by said terminal tabs and adapted to contact said tabs, said light-sensitive device being adapted to be placed in position by insertion through the opening in said back face, and said instrument being adapted to be inserted through the back opening when said opening is being closed by said cover, whereby an electrical connection is made through said terminal tabs when the casing is closed, and said instrument and said light-sensitive device may be tested independently before assembly of said photometer.

5. A photometer comprising an electrical instrument having a pair of terminal strips, a generally rectangular casing having openings at at least two faces thereof, conveniently designated as the top and back of the casing and having a pair of grooves extending along the side walls of the casing from front to back with upper and lower projecting surfaces in a plane substantially parallel to said top face, a light-sensitive device in plate form having such lateral dimension as to fit within said grooves, a rectangular frame of conducting material having a terminal tab extending from one side thereof, said frame being of substantially the same size as said light-sensitive plate, a spring support of conducting sheet material having a projected area substantially the same as the surface of the plate and having a terminal tab extending from one side thereof but offset in position in relation to the terminal tab extending from said frame, said frame, light-sensitive plate, and spring being mounted at the top wall of said casing in said grooves with the said tabs extending toward the back of the casing and with the conducting frame above the light-sensitive plate and the spring strip below it, said spring strip having its ends bowed downward abutting against the lower surfaces of said groove whereby said light-sensitive plate is firmly supported in said casing externally exposed through the openings in said conducting frame and in the top of said casing, said frame, plate, and spring support as a unit being adapted to be placed in position by insertion through the back opening, said instrument terminal strips being adapted to make contact with said terminal tabs.

6. A photometer comprising a substantially rectangular casing having at least two openings referred to for convenience as the top opening and the back opening, a light-sensitive device secured in the upper portion to said casing so as to be externally exposed through said top opening, having a pair of backwardly projecting terminal tabs, a back plate for closing said opening, an electrical indicating instrument secured to said back plate and having a pair of terminal strips upwardly extending along the inner surface of said back plate, said strips being composed of electrically conducting spring material and being bowed inward and being so positioned as to bear against said terminal tabs of the light-sensitive device when the back plate of the casing is secured thereto, whereby the light-sensitive device and the instrument may be independently tested and the instrument may be adjusted independently before assembly of the photometer.

7. In a photometer a generally rectangular casing having openings at two faces thereof designated as the top and back faces of the casing, the opening in the top being substantially coextensive with the top face, supporting means extending along the side walls of the casing from front to back in a plane substantially parallel to said top face, a light-sensitive device in plate form substantially coextensive with said top face, a spring support in sheet form having substantially the same projected area as the surface of said light-sensitve device but bowed out of plane shape, said spring support being interposed between the lower surface of said light-sensitive device and the supporting means along the side walls of the casing, the ends of said spring support being bowed downward whereby said light-sensitive device is resiliently supported and externally exposed through the opening in the top of said casing, said back opening extending to the top of the casing beyond said supporting means for permitting insertion and removal of said light-sensitive device, and a cover plate closing said last-mentioned opening.

8. In a photometer, a generally rectangular casing having a light admitting opening in one of the walls thereof, walls on either side of said first-mentioned wall perpendicular thereto, grooves with upper and lower projecting surfaces extending along the side walls of the casing from front to back in a plane substantially parallel to said first-mentioned wall, a light-sensitive device in plate form adapted to fit against the upper projecting surface of said grooves so as to be externally exposed through the opening in said top wall, and a spring strip of substantially the same projected area as the surface of said light-sensitive device, said spring strip being bowed with the outer ends downward and being mounted with its mid portion against the mid portion of said light-sensitive device and the lower ends abutting the lower surface of said grooves for resiliently securing said light-sensitive device.

9. In a photometer, a casing having a wall with a light admitting opening therein substantially coextensive with the said wall, and walls on either side thereof transverse thereto, supporting means extending along the side walls of the casing in a plane substantially parallel to said first-mentioned wall, a light-sensitive device in plate form substantially coextensive with said first-mentioned wall, a spring strip of substantially the same projected area as the surface of said light-sensitive device but bowed out of plane shape, said spring support being interposed between the lower surface of said light-sensitive device and the supporting means along the side walls of the casing, the ends of said spring support being bowed downward whereby said light-sensitive device is resiliently supported and externally exposed through the said opening in the casing wall.

10. A photometer comprising a casing having a wall with a light-admitting opening therein, a light-sensitive device in plate form substantially coextensive with said light admitting opening adapted to fit against the inner surface of said wall around the rim of the opening therein so as to be externally exposed through the opening, a spring strip of conducting material having substantially the same projected area as the surface of said light-sensitive device, said spring strip being bowed with the outer ends inward and being mounted with its mid portion against the mid portion of said light-sensitive device, supporting means in said casing against which the outer ends of said spring strip are adapted to abut for resiliently securing said light-sensitive device, a strip of conducting material in electrical contact with a portion of the outer surface of said light-sensitive device, an electrical instrument supported in said casing, and electrical connections from said instrument to said conducting strip and to said spring strip.

JAMES H. GOSS.
FRANCIS K. McCUNE.